United States Patent
Autor et al.

(10) Patent No.: US 8,922,585 B2
(45) Date of Patent: Dec. 30, 2014

(54) DISPLAY CONTROLLER

(75) Inventors: Jeffrey S. Autor, Houston, TX (US);
Theodore F. Emerson, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2328 days.

(21) Appl. No.: 11/585,756

(22) Filed: Oct. 24, 2006

(65) Prior Publication Data
US 2008/0094413 A1    Apr. 24, 2008

(51) Int. Cl.
G09G 5/377    (2006.01)
G06F 3/14    (2006.01)
G06F 11/07    (2006.01)
G09G 5/36    (2006.01)
G09G 5/393    (2006.01)

(52) U.S. Cl.
CPC .............. *G06F 3/14* (2013.01); *G06F 11/0769* (2013.01); *G09G 5/363* (2013.01); *G09G 5/393* (2013.01); *G09G 2330/026* (2013.01); *G09G 2340/12* (2013.01)
USPC ....................................................... 345/629

(58) Field of Classification Search
USPC ........................................................ 345/629
See application file for complete search history.

(56) References Cited

U.S. PATENT DOCUMENTS

| | | | | |
|---|---|---|---|---|
| 4,841,291 A * | 6/1989 | Swix et al. | ..................... | 345/473 |
| 5,059,960 A * | 10/1991 | Rosenberg et al. | ........... | 345/174 |
| 5,401,947 A * | 3/1995 | Poland | .......................... | 235/383 |
| 5,530,759 A * | 6/1996 | Braudaway et al. | ............ | 380/54 |
| 5,701,161 A * | 12/1997 | Williams et al. | ............... | 348/468 |
| 6,072,489 A * | 6/2000 | Gough et al. | .................. | 715/803 |
| 6,396,473 B1 * | 5/2002 | Callahan et al. | ............... | 345/530 |
| 6,400,379 B1 * | 6/2002 | Johnson et al. | ................ | 715/721 |
| 6,674,891 B1 * | 1/2004 | Sameshima | .................... | 382/152 |
| 2002/0107936 A1 * | 8/2002 | Amon | ........................... | 709/217 |
| 2003/0159141 A1 * | 8/2003 | Zacharias | ........................ | 725/37 |
| 2003/0202015 A1 * | 10/2003 | Battles et al. | .................. | 345/764 |
| 2003/0229900 A1 * | 12/2003 | Reisman | .......................... | 725/87 |
| 2003/0234892 A1 * | 12/2003 | Hu et al. | ......................... | 348/607 |
| 2004/0027487 A1 * | 2/2004 | Rzadzki et al. | ................. | 348/563 |
| 2004/0119728 A1 * | 6/2004 | Blanco et al. | .................. | 345/629 |
| 2004/0164924 A1 * | 8/2004 | Boger | ............................. | 345/3.1 |
| 2004/0192435 A1 * | 9/2004 | Marshall et al. | ................ | 463/25 |
| 2004/0268405 A1 * | 12/2004 | Zigmond et al. | ............... | 725/112 |
| 2005/0030319 A1 * | 2/2005 | Rai et al. | ........................ | 345/619 |
| 2005/0246638 A1 * | 11/2005 | Whitten | ......................... | 715/708 |
| 2006/0061597 A1 * | 3/2006 | Hui | ................................ | 345/629 |
| 2007/0207727 A1 * | 9/2007 | Song et al. | .................... | 455/3.06 |
| 2008/0045234 A1 * | 2/2008 | Reed | ............................. | 455/456.1 |
| 2008/0059571 A1 * | 3/2008 | Khoo | ............................. | 709/203 |
| 2008/0177994 A1 * | 7/2008 | Mayer | ............................... | 713/2 |
| 2008/0215192 A1 * | 9/2008 | Hardman et al. | ................. | 701/3 |
| 2010/0090006 A1 * | 4/2010 | Gomez et al. | .................. | 235/454 |

* cited by examiner

*Primary Examiner* — Javid A Amini
(74) *Attorney, Agent, or Firm* — Kraguljac & Kalnay LLC; John T. Kalnay (57) ABSTRACT

Systems, methods, and other embodiments associated with a display controller are described. One display controller embodiment includes a data store to store overlay control data, a port to communicate with an overlay control data provider, and a logic to provide an overlay to a display device. The display device may be associated with a computing system that does not provide the overlay control data. The logic may be controlled by the overlay control data provider.

19 Claims, 6 Drawing Sheets

DISPLAY CONTROLLER

BACKGROUND

In some computing systems (e.g., server, PC (personal computer)), a main processor (e.g., CPU (central processing unit)) was or acted as the only intelligent component in the computing system. These types of systems therefore relied on the main processor to initialize (e.g., boot) the video controller and/or other elements (e.g., cache, memory, bus). This initialization was required before any video could be displayed on a display device (e.g., monitor) associated with the system. However, problems may have arisen during the initialization of the video controller or other components. Without an initialized and functioning video controller the user may have been left in the dark about the problem(s) and/or the state of the system.

Additionally, with a video controller that depended on a host system for resources (e.g., power, memory, operating system support, processor cycles) an error, fault, delay, interruption, or so on associated with those resources could impact the video controller. Once again this could leave a user without information concerning system status, system health, resources, and so on.

In some computing systems, in addition to video output depending on and/or otherwise being entwined with system resources, the video output may have been tasked with reporting errors associated with the resources. However, errors associated with these interdependent resources may have negatively impacted the ability of the video output to report the errors. Thus, errors like processor errors, video memory errors, bus errors, and/or other "crash-worthy" events may have gone unreported.

To respond to these issues, some systems may have added components (e.g., LED (light emitting diode), LCD (liquid crystal display), speaker) in an attempt to be able to communicate some form of information when the video controller could not due to its dependence on the host system and/or its resources. However, these additional components may have provided minimal and/or easily misunderstood information, may have been located in positions that were not easily accessed, may have provided cryptic messages, may have added cost to a system, and so on.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. Furthermore, elements may not be drawn to scale.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer component", as used herein, refers to a computer-related entity (e.g., hardware, firmware, software, combinations thereof). Computer components may include, for example, a process running on a processor, a processor, an object, an executable, a thread of execution, a program, and a computer. A computer component(s) may reside within a process and/or thread. A computer component may be localized on one computer and/or may be distributed between multiple computers.

"Computer-readable medium", as used herein, refers to a medium that participates in directly or indirectly providing signals, instructions and/or data that can be read by a computer. A computer-readable medium may take forms, including, but not limited to, non-volatile media (e.g., optical disk, magnetic disk), and volatile media (e.g., semiconductor memory, dynamic memory). Common forms of computer-readable mediums include floppy disks, hard disks, magnetic tapes, CD-ROMs, RAMs, ROMs, and so on.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between multiple logical and/or physical entities.

"Logic", as used herein, includes but is not limited to hardware, firmware, software and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. In some examples, logic may be fully embodied as software. Where multiple logical logics are described, it may be possible in some examples to incorporate the multiple logical logics into one physical logic. Similarly, where a single logical logic is described, it may be possible in some examples to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, threads, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, co-operating, and/or parallel processing logics and thus may be loaded and/or executed in serial, parallel, massively parallel and other manners.

Suitable software for implementing various components of example systems and methods described herein may be developed using programming languages and tools (e.g., Java, C#, C++, C, SQL, APIs, SDKs, assembler). Software, whether an entire system or a component of a system, may be embodied as an article of manufacture and maintained or provided as part of a computer-readable medium. Software may include signals that transmit program code to a recipient over a network or other communication medium.

"User", as used herein, includes but is not limited to, one or more persons, software, computers or other devices, or combinations of these.

Some portions of the detailed descriptions that follow are presented in terms of algorithm descriptions and representations of operations on electrical and/or magnetic signals capable of being stored, transferred, combined, compared, and otherwise manipulated in hardware. These algorithmic descriptions and representations are used by those skilled in the art to convey the substance of their work to others. An algorithm is here, and generally, conceived to be a sequence of operations that produce a result. The operations may include physical manipulations of physical quantities.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

Figure 1:
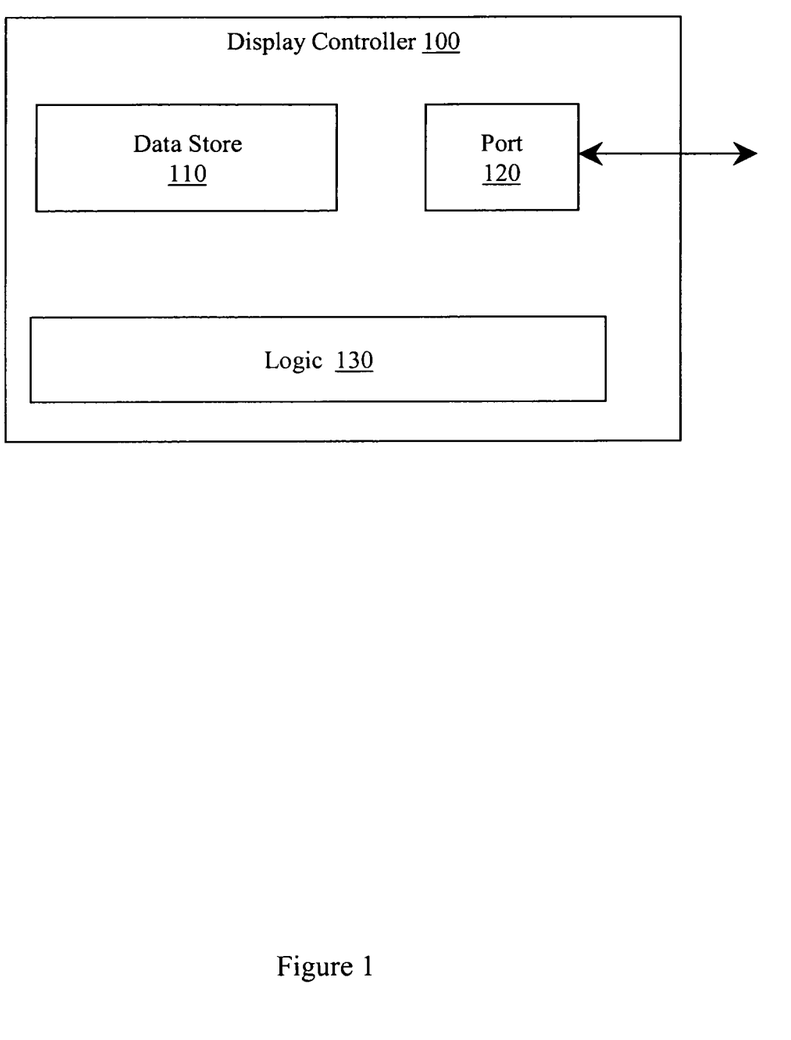
FIG. 1 illustrates elements of one example display controller having an overlay function capability.

FIG. 1 illustrates elements of one example display controller 100 having an overlay function capability. The display controller 100 may be logically "de-coupled" from a host computing system with which it interacts. Being de-coupled means that the display controller 100 may not be completely dependent on a computing system to which it provides video services for resources including initialization processes, processor cycles, memory, power, and so on. In some cases, being de-coupled means that the display controller 100 may be completely independent and/or substantially completely independent of a computing system for which it provides video services. The display controller 100 may therefore depend on another system (e.g., a management system) for some of these resources and/or may be self-reliant in some aspects.

Providing an overlay function means that the display controller 100 will be able to provide an image to a display device that selectively includes another image (e.g., overlay). Providing the overlay function means that the image provided by the display controller 100 may include the overlay in a manner that co-exists with and/or "pre-empts" an image provided by a computing system to which display controller 100 provides services. The pre-emption may take the form of the overlay appearing as a pop-up that in some way visually dominates the existing image. For example, the pop-up may be more intense than the image provided by the computing system, may obscure a portion(s) of the image provided by the computing system, may blink, and so on.

The overlay provided by the display controller 100 may provide different types of information. For example, the overlay may provide information about a computing system for which the display controller 100 provided services, information about a management system operably connected to and interacting with the display controller 100, information about an action taken by a management system, and so on. The information about the computing system may describe, for example, errors, impending errors, resource status, and so on. The information about the management system may include, for example, the existence of the management system, an intervention by the management system, and so on.

The display controller 100 may include a data store 110. The data store 110 may include a portion whose access is limited to an overlay data provider. The data store 110 may store an overlay control data that describes the overlay and/or controls its display. Access to the area of data store 110 that stores the overlay control data may also be limited to the overlay data provider. The overlay control data may include, for example, an overlay position data, an overlay size data, and an overlay frame address. The position data may control where on a display device the image provided by the display controller 100 is to be overlaid. The size data may control the dimensions (e.g., height, width) of the image provided by the display controller 100. The overlay frame address may describe where in memory the image can be found.

In one example, the overlay control data may also include attributes data. The attributes data may include an overlay intensity data, an overlay transparency data, an overlay pre-emption data, and so on. The intensity data may control the intensity of the image provided by the display controller 100. In different examples this may be an absolute value (e.g., x on a scale of 1 to 100), a relative value (e.g., x % of a maximum possible), a differential value (e.g., x % brighter than current image), and so on. The transparency data may control how opaque and/or transparent an image appears. In different examples this may be an absolute value (e.g., x on a scale of 1 to 10), a relative value (e.g., x %), and so on. The overlay pre-emption data may describe, for example, the degree to which the displayed message should dominate the display device. For example, a relatively unimportant message (e.g., system scheduled for downtime in 6 hours) may be given a low pre-emption value while a relatively important message (e.g., impending server crash, backup now) may be given a higher pre-emption value.

The display controller 100 may also include a port 120 to communicate with a provider of the overlay control data. The port 120 may be a bi-directional port that facilitates receiving the overlay control data. In different examples, the bi-directional communication port 120 may be an I2C (Inter-Integrated Circuit) port, an SPI (Serial Peripheral Interface) port, a PCI express port, and so on. In some examples, port 120 may be a logical rather than a physical entity. For example, an overlay control data provider may provide data to display controller 100 through a bus. In this case, port 120 may be control and addressing information used to distinguish signals from different providers on the bus.

The display controller 100 may also include a logic 130 to provide an overlay to a display device associated with a computing system that is not the provider of the overlay control data. The computing system may be the system for which the display controller 100 provides video services. The overlay may be an image that can be displayed on the display device either by itself and/or along with an image provided by the computing system. The logic 130 may be controlled by the provider of the overlay control data writing a value(s) to the data store 110. Additionally, the overlay may be rendered by the provider of the overlay control data. In one example, the data store 110 may be a set of registers. These registers may be writeable via the port 120. The port 120 may be considered to be an "out of band" port in that it may not be generally writeable by just any computing component. For example, the port 120 may be configured to only be writeable by select computing components. Thus, the registers may not be made accessible to computing elements that do not have write access to the port 120. In this way, the registers may not be overwritten by the computing device for which display controller 100 is providing services.

Figure 2:
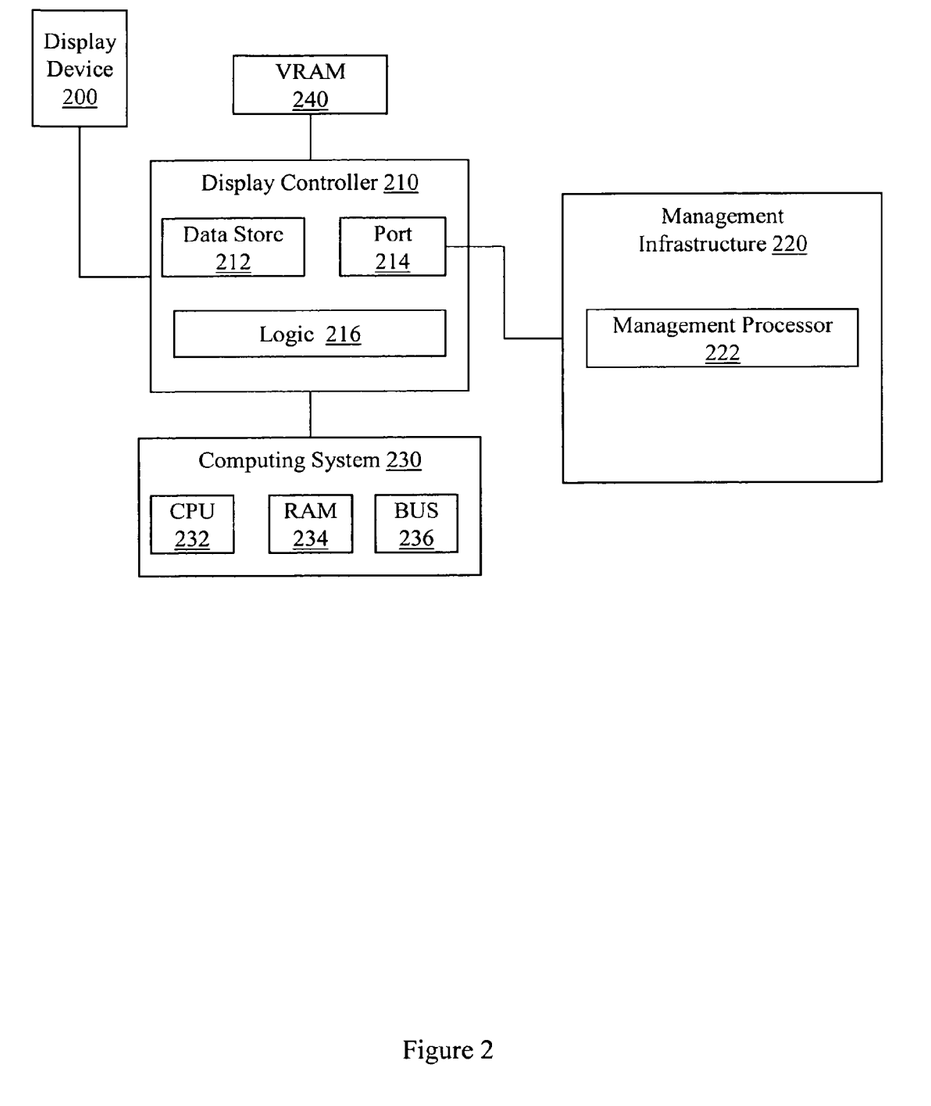
FIG. 2 illustrates one example system in which a decoupled display controller having an overlay function may operate.

FIG. 2 illustrates an example system in which a decoupled display controller 210 that provides an overlay function may operate. The display controller 210 may be operably connected to a display device 200 upon which an image may be presented. The display controller 210 may also be operably connected to a management infrastructure 220, a computing system 230, and a video Ram 240 (VRAM). It is to be appreciated that the VRAM 240 may be different types of memory including, for example, SDRAM (synchronous dynamic random access memory), DDR (double data rate synchronous random dynamic memory), SRAM (synchronous random access memory), DDR-2, and so on. The computing system 230 may display images on the display device 200 using the video controller 210. The computing system 230 may include, for example, a cpu 232, a memory 234, a bus 236, and so on.

The display controller 210 may include a data store 212 (e.g., set of registers), a port 214, and a logic 216. The management infrastructure 220 may provide overlay control data to the display controller 210. This overlay control data may be stored in the registers and used to control how, when, and if an image is overlaid on the display device 200 by the video controller 210. The image may be overlaid, for example, by combining different images for which data is stored in VRAM 240. For example, computing system 230 may provide data that is stored in a first area in VRAM 240. Management infrastructure 220 may also provide data that is stored in a second (e.g., reserved) area in VRAM 240. Display controller 210 may then provide either the first data, the second data, and/or a combination of the first and second data to the display device 200.

Decoupling the display controller 210 from the computing system 230 and communicating with a management infrastructure 220 through the port 214 facilitates providing an image to the display device 200 independent of the computing system 230. Thus, the display controller 210 may display information about the computing system 230 on the display device 200 even if the computing system 230 is in a state that would prevent video display in some systems. For example, the computing system 230 may fail during the power on self test (POST) of some component, may lose power, may experience a crash and so on. The display controller 210 can provide an image to the display device 200 regardless of these occurrences, where some systems could not. The image provided may be written to a portion of VRAM 240 whose access is restricted to an entity communicating through port 214.

The system may also include a video random access memory (VRAM) 240 that is writeable by both the display controller 210 and the management infrastructure 220. As described above, VRAM 240 may be partitioned, including a region(s) whose write access is limited to an entity communicating through port 214. Thus, the management infrastructure 220 may provide an image to the VRAM 240 and provide information about the image to the display controller 210 through the port 214. The information may be stored in the data store 212. Then, the management infrastructure 220 may provide a signal through the port 214 to the logic 216. This signal may control the display controller 210 to display the image stored in the VRAM 240 on the display device 200. Note that these actions occur independent from actions performed by computing system 230. Thus the image provided through port 214 may be displayed on display device 200 independently and/or collaboratively with an image provided from computing system 230.

In one example, the logic 216 can provide the overlay to the display device 200 independent of a state of the computing system 230. These states may include, for example, a boot state, an operating system state, an application state, a failure state, and a power state. The boot state may concern, for example, the progress made in a boot sequence, an error made in a boot sequence, a power on self test (POST) status, and so on. The operating system state may include, for example, a mode (e.g., application mode, kernel mode, supervisory mode), a status (e.g., initializing, running, halted), and so on. The power state may include, for example, powered on, powered off, power saving, and so on. With this freedom from the computing system 230, in some cases, the overlay may appear by itself on the display device 200 if the computing system 230 is incapable of providing an image. In other cases, the overlay may be overlaid on top of an image provided by the computing system 230.

In one example, the logic 216 may provide the overlay to the display device 200 without even consuming a resource of the computing system 230. The resources from which the video controller 210 has been freed may include, for example, processor cycles, memory, operating system actions, application actions, and so on. Thus, the logic 216 may provide the overlay without consuming any processor cycles from the computing system 230, without causing an operating system interrupt, without consuming any memory in the computing system 230, and so on. Therefore, the display controller 210 may provide the overlay function without impacting the workflow of the computing system 230. Furthermore, the display controller 210 may be immune to errors in the computing system 230. For example, while both computing system 230 and management infrastructure 220 may provide image data that is stored in VRAM 240, logic 216 may keep these data separate, and allow data provided by management infrastructure 220 to pre-empt data provided by computing system 230.

To further decouple display controller 210 from computing system 230, in one example the display controller 210 will not be initialized by the computing system 230. Instead, the display controller 210 may be initialized, at least in part, by the management infrastructure 220. For example, the management infrastructure 220 may interrogate the display device 200 for a preferred operating mode, a possible operating mode, and so on. Then, the management infrastructure 220 may initialize the data store 212 (e.g., registers) by writing values through the port 214. These values may depend, for example, on the preferred operating mode, on the possible operating mode, and so on. The values may describe, for example, a resolution, a refresh rate, and so on.

Figure 5:
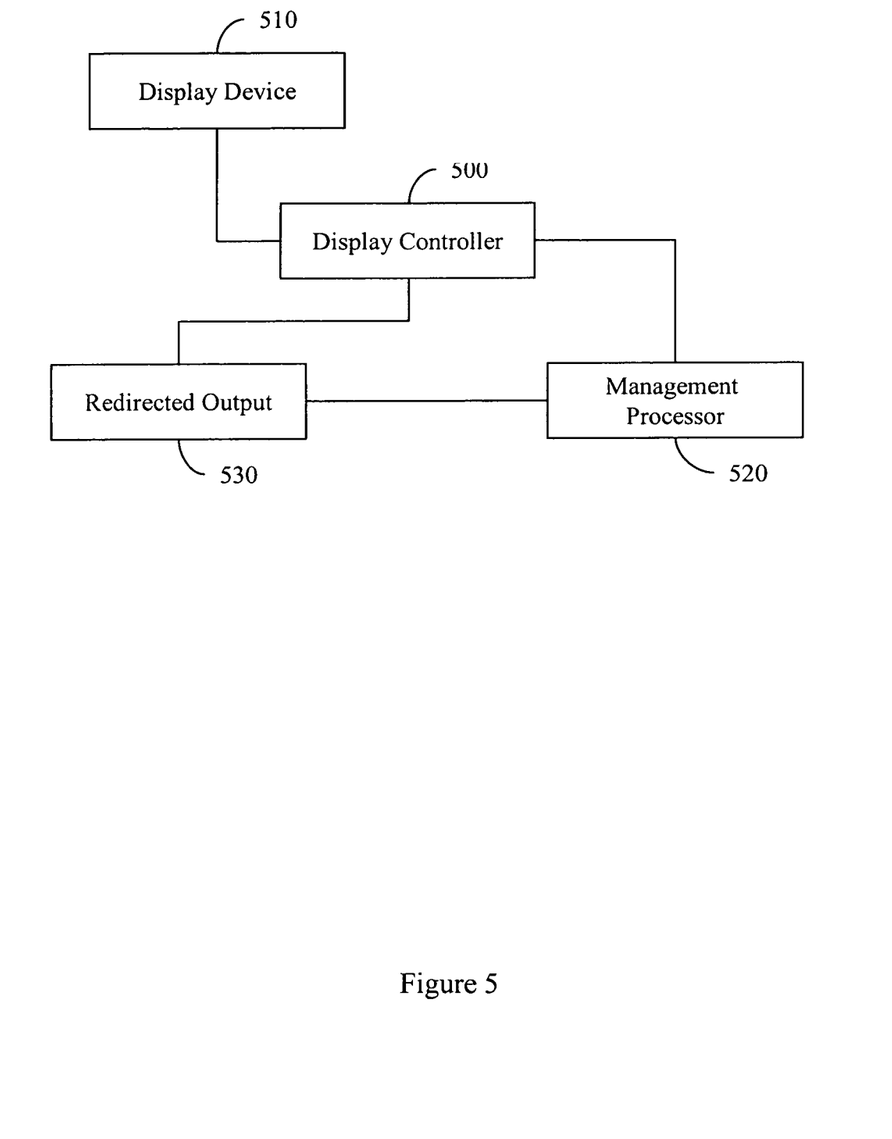
FIG. 5 illustrates elements of one example system in which a display controller may operate.

The management infrastructure 220 may include, for example, a management processor 222. The management processor 222 may be the provider of the overlay control data. In one example, the management processor 222 may be a portion of an ILO (Integrated Lights Out) management infrastructure. Thus, in one example, the overlay provided by the display controller 210 to the display device 200 may include information about an action performed by the management infrastructure 220. In some cases, it may be desirable to shield management infrastructure 220 actions from a user. Thus, in some cases, the overlay provided by the display controller 210 may inform a user that an action is occurring without providing the details of the action. FIG. 5 presents more information about this example.

Figure 3:
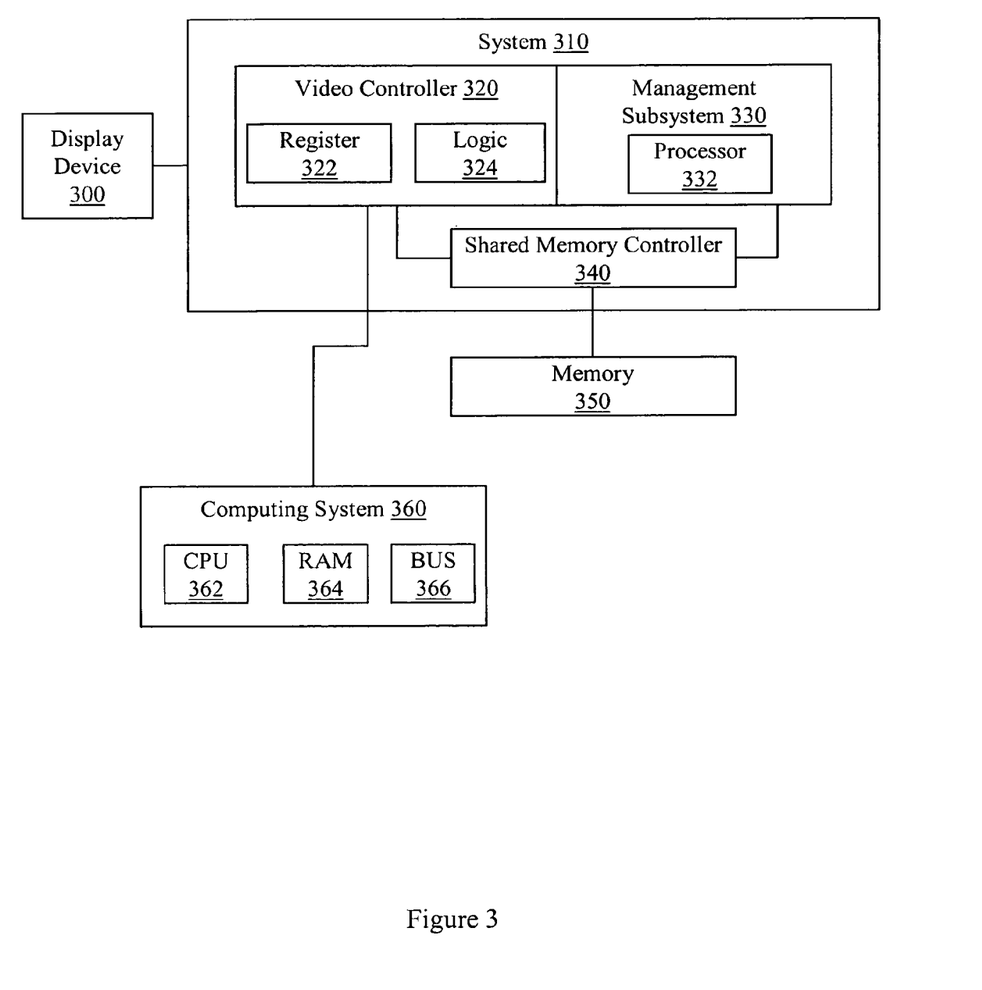
FIG. 3 illustrates one example system in which a decoupled display controller having an overlay function may operate.

In summary, FIG. 2 illustrates one embodiment of a decoupled display controller 210 that is operably connected to a management infrastructure 220. Both computing system 230 and management infrastructure 220 may provide data to display controller 210. Display controller 210 may store this data in separate reserved locations in VRAM 240. Display controller 210 may then decide, based on control signals provided from management infrastructure 220, which of the data to provide as an image to display device 200. FIG. 3 illustrates an embodiment of a decoupled video controller 320 that is integrated into a system 310 that includes a management subsystem 330. Both the display controller 210 and the video controller 320 may provide an overlay function.

FIG. 3 illustrates a system 310 that includes a video controller 320. The video controller 320 includes a register(s) 322 to store control data. The video controller 320 also includes a logic 324 to provide a first image to a display device 300. The first image may be characterized, at least in part, by the control data stored in the register 322. Logic 324 may combine a first image and a second image based, for example, on state in register 322.

The system 310 may also include a management subsystem 330 that includes a processor 332 to write a value(s) to the register 322 to control the logic 324. In one example, management subsystem 330 may be operably connected to video controller 320 by a bus. The processor 332 may be involved in initializing the video controller 320. For example, the processor 332 may provide values to the register 322 when the video controller 320 and/or system 310 come out of reset. However, in one example, the register 322 may come out of a reset state in a pre-determined useable state. For example, the register 322 may come out of reset with values that would drive the display device 300 at a resolution of 1024×768 at 60 Hz. It is to be appreciated that other resolutions and refresh rates may be possible.

System 310 may also include a shared memory controller 340 that is operably connected to the video controller 320, the management subsystem 330, and a memory 350 in which the first image may be stored. While the memory 350 is illustrated outside the system 310, in one example the memory 350 may be included in the system 310.

The system 310 may provide a first image that may appear independently on the display device 300. This mode may be used when the computing system 360 is unable to provide an image, when the computing system 360 is not providing an image, when the image is intended to garner the sole attention of a user, and so on. However, the system 310 may have the first image co-exist on the display device 300 with a second image provided by the computing system 360. In this example, the first image may overlay the second image. That is, the first image may appear to be written over the second image and thus may partially obscure the second image, may completely obscure a portion of the second image, may appear in a pop-up window on top of the second image and so on. These effects may be created by selecting data to present from memory 350. For example, processor 332 may provide the first image to memory 350 and computing system 360 may provide the second image to memory 350. These images may be written to separate locations. Video controller 320 may then select either an individual image and/or create a composite image.

To maintain the decoupling between the video controller 320 of the system 310 and the computing system 360, the management subsystem 330 may render the first image into the memory 350 that is accessible through the shared memory controller 340. This may occur without consuming the attention and/or resources of the computing system 360. Thus, none of a cpu 362, a memory 364, a bus 366, or other components or resources of the system 360 may be impacted. The location into which the first image is rendered may be reserved for data provided by processor 332.

With the first image available in the memory 350, the system 310 may, using the logic 324, overlay the first image on the display device 300 independent of a state (e.g., boot, operating system, application, failure, power) of the computing system 360. Similarly, the system 310 may, using the logic 324, overlay the first image on the display device without consuming a resource (e.g., processor cycle, memory, operating system interrupt) of the computing system 360.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

Figure 4:
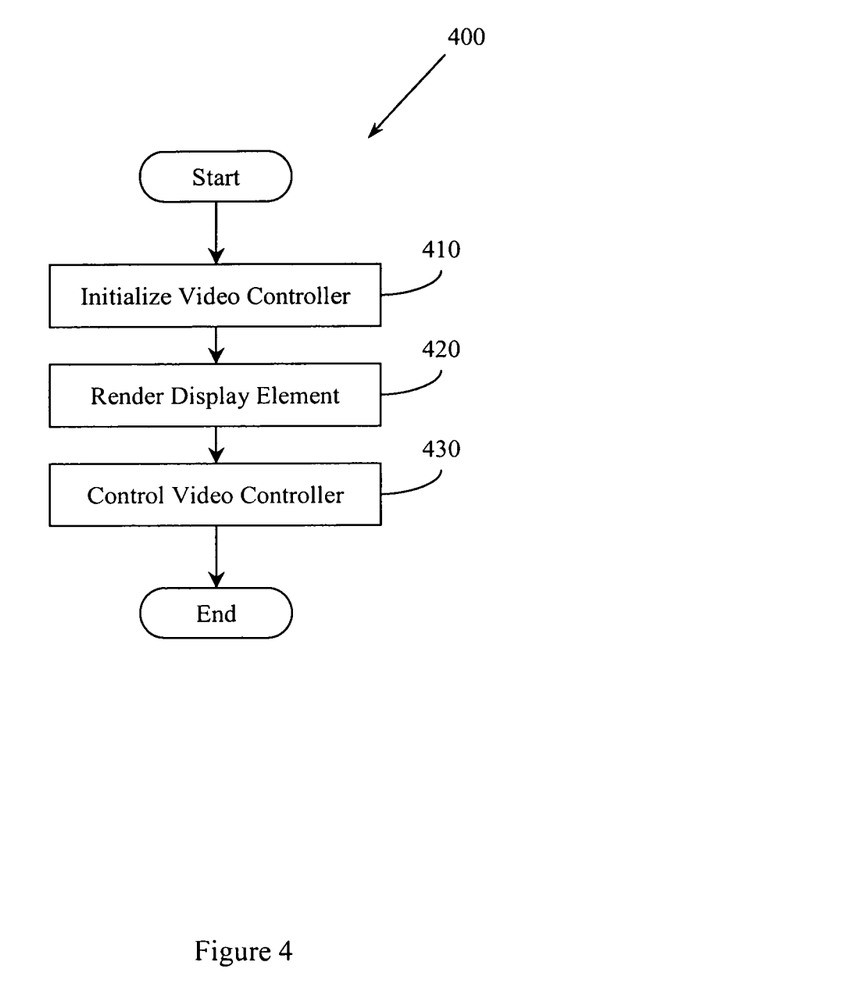
FIG. 4 illustrates actions associated with a display controller method.

FIG. 4 illustrates a method 400 associated with a decoupled video controller. The method 400 includes, at 410, initializing at least a portion of a video controller that is operably connected to both a computing system to which the video controller is providing video services and to a display device on which the video services are provided. In one example, the initializing may be a subset of initialization actions that may be performed by a computing system. However, the initializing is not performed by the computing system. Instead, in one example, the initializing is performed by a management processor that is also operably connected to the computing system. Thus, the initializing is performed independent of the computing system to which the video controller is providing video services. The initializing may be limited, for example, to actions associated with starting overlay logic and starting video output. Thus, the initializing may include, for example, providing values to the video controller to control overlay size, shape, position, and so on. The initializing may not include, for example, initializing a host interface (e.g., PCI). That task may remain, for example, in the computing system POST/BIOS code.

The method 400 may also include, at 420, rendering a display element in a memory operably connected to the video controller. Once again, the rendering is not performed by the computing system to which the video controller is providing video services. Instead, in one example, the rendering is performed by the management processor. In one example, the display element may be a popup that includes a message. The message may concern, for example, the computing system, the management processor, an action taken by the management processor, and so on. For example, the message may provide information about a system failure, about a system boot status, about a management system action, and so on.

The method 400 may also include, at 430, controlling the video controller to overlay the display element on the display device. In one example the control is performed by the management processor. In one example, the video controller may be controlled to overlay the display element independent of a state of the computing system to which the video controller is providing video services. The states from which the video controller may act independently include, for example, a boot state, an operating system state, an application state, a failure state, and a power state. Thus, in one example, the video controller may be controlled to overlay the display element even if the computing system has crashed, has been powered down, is completely occupied with operating system and/or application processing, and so on. In one example, the video controller can be controlled to overlay the display element without consuming a computing system resource (e.g., processor cycle, memory location, operating system action, application action). Since the video controller can be controlled to overlay the display element without using system resources and independent of system states, method 400 facilitates providing the overlay without impacting the workflow of the computing system.

In one example, controlling the video controller at 430 may include establishing a display element position, a display element size, a display element shape, a display element intensity, a display element transparency, a display element pre-emption status, and so on. In different embodiments these attributes may be described in various ways. For example, the position may be described using absolute co-ordinates, relative co-ordinates, and so on. The size may be described, for example, using absolute measurements, percentage of display measurements, and so on. The shape may be described using, for example, a widget identifier, a window identifier, corner co-ordinates, and so on. The intensity may be described, for example, using an absolute intensity, a percentage of maximum intensity, an intensity relative to a system supplied image, and so on. The pre-emption status may be described, for example, using a percentage of a screen to obscure, a degree to which a screen should be obscured, and so on.

FIG. 5 illustrates a display controller 500 interacting with a first display device 510, a management processor 520, and a second display device upon which redirected output 530 may be displayed. The management processor 520 may provide local overlays and may examine (e.g., view) the redirected output 530. The display controller 500 may be controlled to provide either a regular output to the display device 510 or to provide an overlay to display device 510.

The display controller 500 may be controlled by the management processor 520 to provide an overlay to display device 510 and to not provide the overlay on the redirected output 530. In this way, the management processor 520 may be able, for example, to perform remote management of a system that provides output for display device 510 while presenting a "remote management in process" indication on the display device 510.

In another example, display controller 500 may present local overlays that would provide data concerning a local system (e.g., local memory failure, local fan burnt out) to display device 510 while not providing these overlays on redirected output 530. The management processor 520 may control the display controller 500 to not provide these overlays.

In another example, the management processor 520 may be engaged in activities about which it does not want information provided to the display device 510. For example, some security sensitive operations may include outputs about which a user should not be made aware. Thus, the management processor 520 may control the display controller 500 to provide a "masking" or "cloaking" overlay that provides some feedback to the display device 510 without providing the secure information. In this way a user may be aware that something is happening and leave their system alone while it continues but may not be made aware of the details of what is happening. In some conventional systems, the display device 510 may simply be blanked out while the secure operation is happening, leaving the user in the dark and prompting undesired actions like rebooting their system. The display controller 500 and the management processor 520 may prevent that unfortunate circumstance.

The control exercised by management process 520 may include, for example, providing a signal to display controller 500, writing a value to a control register in display controller 500, and so on.

Figure 6:
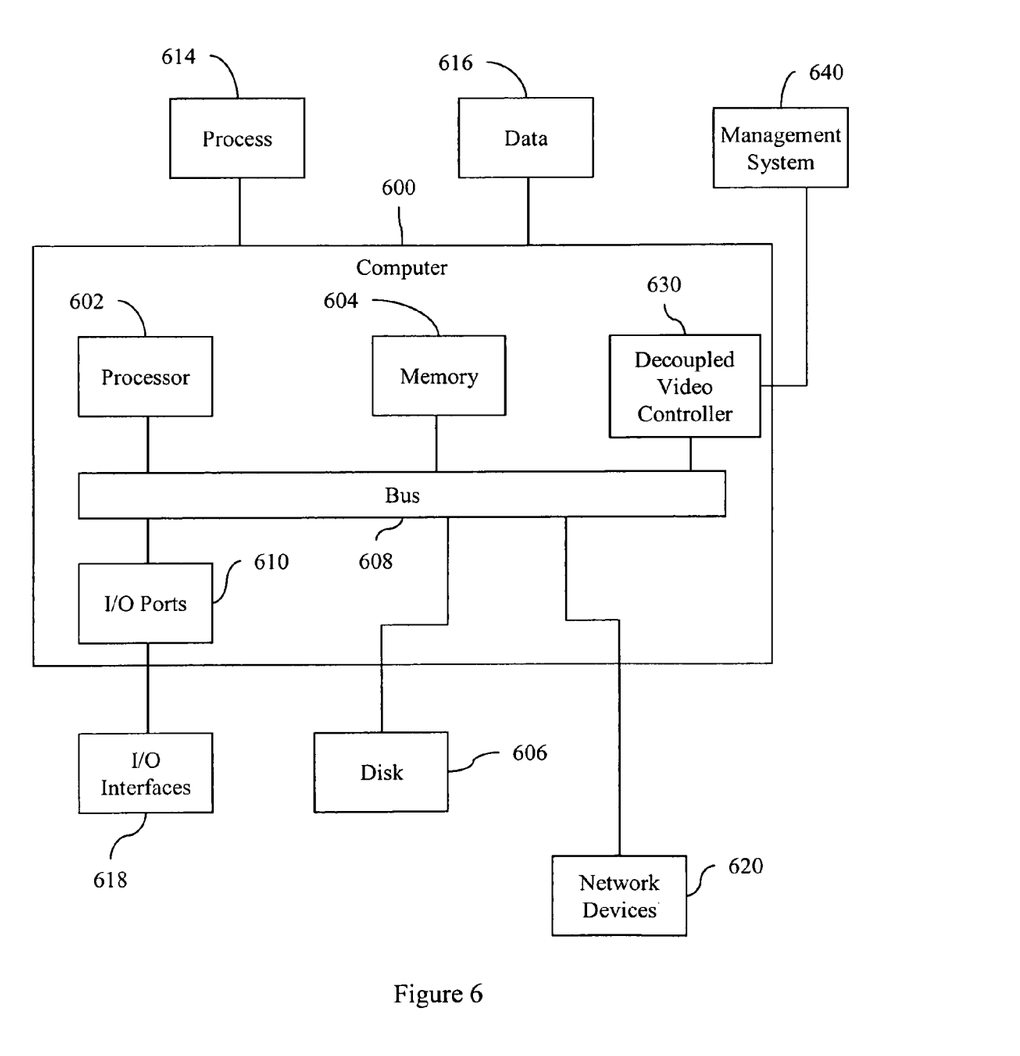
FIG. 6 illustrates an example computing environment in which example systems and methods illustrated herein may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. While bus 608 is illustrated as a single item, it is to be appreciated that bus 608 may be a collection of busses, a bus topology, a bus "fabric", and so on.

In one example, the computer 600 may include a decoupled video controller 630. The video controller 630 may facilitate providing video output for the computer 600 independent of the state(s) (e.g., initialization, power, error) of the computer 600 or its components. In one example, the video controller 630 may be connected to a management system 640 through a bi-directional port. In another example, the video controller 630 may be integrated into the management system 640. In another example, management system 640 may be connected to other elements of computer 600 through, for example, bus 608.

Generally describing an example configuration of the computer 600, the processor 602 may be a variety of various processors including dual microprocessor and other multi-processor architectures. The memory 604 may include volatile memory (e.g., random access memory (RAM)) and/or non-volatile memory (e.g., read only memory (ROM)).

In one example, the disk 606 may be operably connected to the computer 600 via, for example, an input/output interface (e.g., card, device) 618 and an input/output port 610. In another example, disk 606 may be connected to bus 608 through, for example, a disk controller. The disk 606 may be, for example, a magnetic disk drive, a solid state disk drive, a floppy disk drive, a tape drive, and so on. The memory 604 can store processes 614 and/or data 616, for example. The disk 606 and/or the memory 604 can store an operating system that controls and allocates resources of the computer 600.

The bus 608 may be a single internal bus interconnect architecture and/or other bus or mesh architectures. The bus may be, for example, a high speed local bus (e.g., processor bus, hyper-transport bus, high-speed serial interconnect) and/or a fabric of busses. While a single bus is illustrated, it is to be appreciated that the computer 600 may communicate with various devices, logics, and peripherals using other busses (e.g., PCIE, SATA, Infiniband, 1394, USB, Ethernet). The bus 608 can be types including, for example, a memory bus, a memory controller, a peripheral bus, an external bus, a crossbar switch, a local bus, and so on.

The computer 600 may interact with input/output devices via i/o interfaces 618 and input/output ports 610. The input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 through which computer 600 may interact with a network. Through the network, the computer 600 may be logically connected to remote computers. Networks with which the computer 600 may interact include, but are not limited to, a local area network (LAN), a wide area network (WAN), and other networks. In different examples, the network devices 620 may connect to LAN technologies including, for example, fiber distributed data interface (FDDI), copper distributed data interface (CDDI), Ethernet (IEEE 802.3), token ring (IEEE 802.5), wireless computer communication (IEEE 802.11), and Bluetooth (IEEE 802.15.1). Similarly, the network devices 620 may connect to WAN technologies including, for example, point to point links, circuit switching networks (e.g., integrated services digital networks (ISDN)), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methods for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
   a display device;
   a computing system with a processor that provides images to the display device;
   a provider with a processor; and
   a display controller operably connected to the provider and including:
   a data store to store an overlay control data;
   a port to communicate with the provider that provides the overlay control data to the display controller; and
   a logic to provide an overlay to the display device, the overlay being an image that is displayed on the display device, the logic being controlled, at least in part, by the provider of the overlay control data, the overlay being described by the overlay control data, the overlay being rendered by the provider of the overlay control data, wherein the logic provides the overlay to the display device in response to an error state of at least one component of the computing system, wherein the error state prohibits information from the computing system to be displayed on the display device, and wherein the display controller and the provider are not initialized by the computing system.

2. The system of claim 1, wherein the provider is a management infrastructure that initializes the display controller.

3. The system of claim 1, wherein the overlay control data comprising one or more of, an overlay position data, an overlay size data, an overlay frame address, an overlay intensity data, an overlay transparency data, and an overlay pre-emption data.

4. The system of claim 1, wherein the display controller displays the image of the overlay on the display device when the computing system fails during a power on self test (POST).

5. The system of claim 1, wherein the logic operates independent of the computing system and provides the overlay to the display device when the computing system loses power.

6. The system of claim 1, wherein the display controller displays the image of the overlay on the display device without consuming memory in the computing system and without consuming processor cycles of the computing system.

7. The system of claim 1, wherein the provider of the overlay control data interrogates the display device for one or more of, a preferred operating mode, and a possible operating mode, and wherein the provider of the overlay control data initializes the data store based, at least in part, on one or more of, the preferred operating mode, and the possible operating mode.

8. A system, comprising:
a display device;
a computing system with a processor that provides images to the display device;
a video controller operatively coupled to the display device and the computing system, the video controller comprising:
one or more registers to store an overlay control data; and
logic configured to provide a first image to the display device in response to at least one component of the computing system entering an error state, the first image being characterized, at least in part, by the overlay control data, wherein the error state prohibits the display device from displaying information from the computing system;
a management subsystem comprising a processor to write one or more values to the one or more registers to control the logic; and
a shared memory controller operably connected to the video controller, to the management subsystem, and to a memory in which the first image is stored, the video controller being initialized, at least in part, by the processor of the management subsystem and not by the computing system.

9. The system of claim 8, wherein the first image is displayed independently on the display device, or along with a second image provided to the display device by the computing system to which the video controller provides a video service, the first image overlaying the second image.

10. The system of claim 8, wherein the video controller displays images on the display device when the computing system fails during a power on self test (POST) and when the computing system loses power.

11. The system of claim 8, wherein the one or more registers come out of a reset state in a pre-determined useable state.

12. The system of claim 9, wherein the logic overlaying the first image on the display device is independent of a state of the computing system, the state comprising a boot state, an operating system state, an application state, a failure state, and a power state, wherein the logic overlays the first image on the display device without consuming a resource of the computing system.

13. A method, comprising:
displaying, on a display device, images received from a computing system that includes a processor;
initializing, without assistance from the computing system, a video controller with a management processor, wherein the video controller is operably connected to the display device and to the computing system for which the video controller provides a video service, and wherein the initializing is performed independent of a state of the computing system;
rendering a display element in a memory operably connected to the video controller, wherein the rendering is performed by the management processor in response to at least one component of the computing system entering an error state that prohibits information from being displayed by the display device from the computing system; and
controlling the video controller to overlay the display element on the display device while the display device is prohibited from displaying information from the computing system due to the error state, where the controlling is performed by the management processor.

14. The method of claim 13, wherein the display element comprises a popup message concerning one or more of information concerning the computing system and information concerning a management processor action.

15. The method of claim 13, further comprising:
controlling the video controller to overlay the display element independent of a state of the computing system, the state comprising a boot state, an operating system state, an application state, a failure state, and a power state; and
controlling the video controller to overlay the display element without consuming a resource of the computing system, the resource comprising a processor cycle, a memory location, an operating system action, and an application action.

16. The method of claim 13, further comprising:
displaying images on the display element when the computing system fails during a power on self test (POST) and when the computing system loses power.

17. The system of claim 1, wherein the display controller is logically de-coupled from the computing system.

18. The system of claim 1, wherein the overlay comprises information that describes the error state.

19. The method of claim 13, wherein initializing at least a portion of a video controller comprises:
providing at least one value to the video controller, where the value is used in controlling the video controller.

* * * * *